US009355311B2

(12) United States Patent
Vu

(10) Patent No.: US 9,355,311 B2
(45) Date of Patent: May 31, 2016

(54) REMOVAL OF GRAPHICS FROM DOCUMENT IMAGES USING HEURISTIC TEXT ANALYSIS AND TEXT RECOVERY

(71) Applicant: KONICA MINOLTA LABORATORY U.S.A., INC., San Mateo, CA (US)

(72) Inventor: Cuong Vu, San Lorenzo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/494,257

(22) Filed: Sep. 23, 2014

(65) Prior Publication Data

US 2016/0086026 A1    Mar. 24, 2016

(51) Int. Cl.
| | | |
|---|---|---|
| G06K 9/34 | (2006.01) | |
| G06K 9/00 | (2006.01) | |
| G06F 17/24 | (2006.01) | |
| G06F 17/21 | (2006.01) | |
| G06T 7/00 | (2006.01) | |
| G06F 17/30 | (2006.01) | |
| G06K 9/40 | (2006.01) | |

(52) U.S. Cl.
CPC .......... *G06K 9/00456* (2013.01); *G06F 17/211* (2013.01); *G06F 17/212* (2013.01); *G06F 17/24* (2013.01); *G06F 17/30994* (2013.01); *G06K 9/00463* (2013.01); *G06K 9/00523* (2013.01); *G06K 9/346* (2013.01); *G06K 9/40* (2013.01); *G06T 7/0081* (2013.01); *G06T 7/0089* (2013.01); *G06K 2009/00489* (2013.01); *G06K 2209/01* (2013.01); *G06T 2207/10008* (2013.01); *G06T 2207/20124* (2013.01); *G06T 2207/30176* (2013.01); *G06T 2210/12* (2013.01)

(58) Field of Classification Search
CPC ........................... G06K 9/00456; G06K 9/325
USPC .................................................. 382/175–176
See application file for complete search history.

(56) References Cited

U.S. PATENT DOCUMENTS

| | | | | |
|---|---|---|---|---|
| 7,324,711 B2* | 1/2008 | Nagarajan | .......... | G06K 9/00449 375/E7.2 |
| 8,351,691 B2* | 1/2013 | Chen | .................. | G06K 9/00456 358/1.9 |
| 8,625,895 B2* | 1/2014 | Ma | ...................... | G06K 9/00456 382/173 |
| 8,634,644 B2 | 1/2014 | Chiu et al. | | |
| 8,818,099 B2* | 8/2014 | Tian | ....................... | G06K 9/346 382/176 |
| 2007/0110322 A1* | 5/2007 | Yuille | .................... | G06K 9/325 382/227 |

OTHER PUBLICATIONS

C. Xu, Z. Tang, X. Tao, and C. Shi, "Graphic composite segmentation for PDF documents with complex layout", Document Recognition and Retrieval XX, SPIE-IS&T, vol. 8658, Feb. 4, 2013.
R. Garg, A. Bansal, S. Chaudhury, S. D. Roy, "Text graphic separation in Indian newspapers", 4th International Workshop on Multilingual OCR, 2013.

* cited by examiner

*Primary Examiner* — Kanjibhai Patel
(74) *Attorney, Agent, or Firm* — Chen Yoshimura LLP

(57) ABSTRACT

A graphic removal process for document images involves two stages: First, removal of graphics in the document image based on heuristic text analyses; and second, text recovery to recover some text that is accidentally removed during the first stage. The first stage uses a relatively aggressive strategy to ensure that all graphics components are removed, which also temporarily leads to the removal of some text; the lost text will then be recovered using the text recovery technique. The heuristic text analyses utilize the geometric properties of text characters and consider the properties of text characters in relation to their neighbors. The text recovery technique starts from the text that remain after the first stage, and recovers any connected component that is at least partially located within a pre-defined neighboring area around any of the text components in the intermediate document image.

20 Claims, 3 Drawing Sheets

REMOVAL OF GRAPHICS FROM DOCUMENT IMAGES USING HEURISTIC TEXT ANALYSIS AND TEXT RECOVERY

BACKGROUND OF THE INVENTION

1. Field of the Invention

This invention relates to document image processing, and in particular, it relates to a method for removing graphics from a document image while preserving text.

2. Description of Related Art

Document images typically refer to digital images that contain significant amount of text. Such images may also contain graphics, such as pictures or other types of graphics. Graphics in a document image can make it harder to understand the text of the document, for example when the goal is to extract the text of the document to perform OCR (optical character recognition). Therefore, one important step in processing document images is removal of graphics. The goal of graphics removal is to obtain a document with only texts for further analysis such as OCR, document authentication, etc.

Many graphic removal methods are known. Some exemplary publications include: C. Xu, Z. Tang, X. Tao, and C. Shi, "Graphic composite segmentation for PDF documents with complex layout", Document Recognition and Retrieval XX, Feb. 4, 2013; R. Garg, A. Bansal, S. Chaudhury, S. D. Roy, "Text graphic separation in Indian newspapers", 4th International Workshop on Multilingual OCR, 2013; U.S. Pat. No. 8,634,644 "System and method for identifying pictures in documents," issued Jan. 21, 2014. A common strategies in known methods for separating text and graphics include using OCR for text recognition, or examining size and/or color of graphics. Some methods use the geometric properties of text characters to separate them from graphics.

SUMMARY

The present invention is directed to a method and related apparatus for removal of graphics in document images that substantially obviates one or more of the problems due to limitations and disadvantages of the related art.

An object of the present invention is to provide a more effective graphic removal process which will give a clearer document image containing only text, which makes it easier for further document analysis.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for removing graphics components in an input binary document image, which includes: (a) determining whether each connected component in the input binary document image is a text component or a graphic component, and removing all connected components that are determined to be graphic components to generate an intermediate document image, the intermediate document image containing a plurality of connected components that are determined to be text components; (b) recovering at least some connected components of the input binary document image that have been removed in step (a) as recovered text components, wherein the recovering step recovers any connected component that is at least partially located within a pre-defined neighboring area around either a text component in the intermediate document image or another recovered text component; and (c) generating an output document image which contains only the connected components that are determined to be text components in step (a) and the connected components recovered in step (b).

Step (b) may include: (b1) setting the intermediate document image as a current text recovery image; (b2) for each connected component of the current text recovery image, defining an expanded bounding box around the connected component by expanding a bounding box of the connected component in one or more directions by predefined amounts; (b3) searching the input binary document image in the expanded bounding boxes of all connected component of the current text recovery image to find any new image components located within the expanded bounding boxes that are not present in the current text recovery image; (b4) updating the current text recovery image to include any new image components found in step (b3); and (b5) repeating steps (b2) to (b4) until no new image components are found within the expanded bounding boxes in step (b3), wherein the new image components found in all iterations of step (b3) collectively form the recovered text components.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

According to embodiments of the present invention, a graphic removal process for document images employs two strategies: First, removal of graphics in a document image based on heuristic text analysis (first stage); and second, a method for text recovery in case some text is removed during the process of removing graphics (second stage). One feature of the above graphic removal process is that the first stage uses a relatively aggressive strategy to remove graphics, which also temporarily leads to the removal of some text; the lost text will then be recovered using a text recovery technique.

Figure 1:
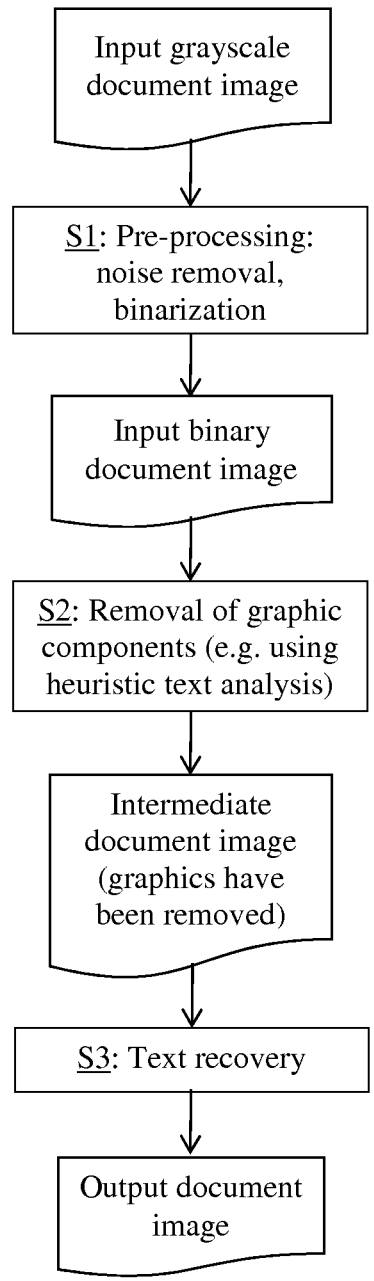
FIGS. 1-3 schematically illustrates a graphic removal process for document images according to an embodiment of the present invention.

A graphic removal process according to an embodiment of the present invention is described below with reference to FIGS. 1-3. FIG. 1 schematically illustrates the overall process stages. First, the document image is pre-processed to convert it from a gray-scale or color image to a binary image (step S1). Any suitable binarization technique may be used for this step, including methods that use a global or local binarization thresholds. Preferably, noise removal is also applied to remove noise such as small and isolated dark dots from the image.

The binary document image contains connected components, which are objects formed by black pixels that are connected to each other. The binary document image is analyzed to distinguish connected components that are text components or graphic components, and graphic components are removed to generate an intermediate document image (step S2). In one embodiment, heuristic text analyses are applied to distinguish text and graphic components, by utilizing the geometric properties of text characters (including letters and other symbols) and considering these properties of text characters in relation to their neighbors, as will be explained in detail later. Then, a text recovery step (step S3) is performed to recover some of the text components that were accidentally removed in the previous step. The text recovery process utilizes the intermediate document image and the original binary image to recover the removed text. In a preferred embodiment, any connected component that is at least partially located within a pre-defined neighboring area around any of the other text components, either text components in the intermediate document image or recovered text components, will be recovered.

Note that the text recovery step is not a step of text reconstruction, where, for example, black pixels are added to an image to repair broken character strokes. Rather, in the text recovery process of the present embodiment, the input binary document image is re-examined, using the intermediate image as a base, and certain connected components of the input binary document image are re-characterized as text component and recovered as a result.

In stage S2, heuristic analyses are performed on connected components of the binary image to determine whether each connected component is a part of text or a part of graphics. Here, graphics broadly refers to any non-text objects in the image, which may include photographs, line drawings, table lines, etc. The heuristic rules applied in stage S2 are based on the observation that text characters usually agree with their neighbors in some of their properties. For example, text characters tend to align with each other in the horizontal and/or vertical directions; neighboring text characters tend to have similar sizes; etc. Connected components resulting from graphics typically do not have these characteristics. Thus, the heuristic rules applied in stage S2 include the following examples:

1. If a connected component is well-aligned with its neighbors, either on the top, bottom, right, or left, it is considered text.

2. There may be text components (text characters, part of text characters, or punctuation marks) that do not satisfy the first condition. The reason may be that some text characters stand in very short lines, or due to the structure (layout) and quality of the document there are not enough neighbors which align with a given connected component. In such a case, the connected components in the document are analyzed to determine whether there are sufficient number of connected components that have similar sizes as the given connected component. If there are, the given connected component is considered text. This is based on the expectation that the same text character will occur many times in the same document.

If a connected component does not meet the above heuristic rules, it is considered part of graphics.

Other properties and rules may be applied in the heuristic analysis. For example, OCR text recognition, stroke width, and other feature analysis may be used to determine whether a connected component is text or graphic.

Figure 2:
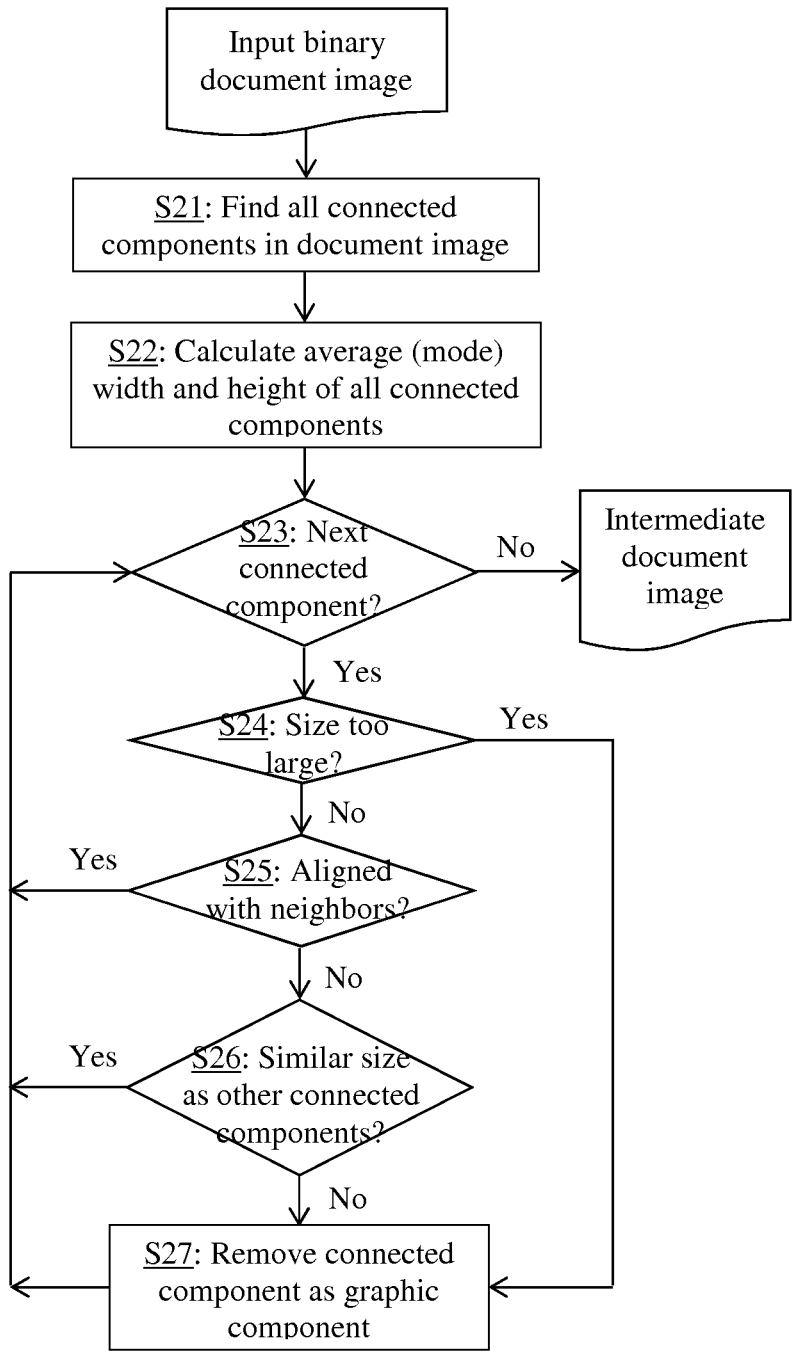

FIG. 2 schematically illustrates the graphic component removal stage (step S2) in more detail. First, connected components are extracted from the input binary image (step S21).

An average width and height of all connected components are calculated (step S22). Here, the width and height of a connected component are the width and height of the bounding box of the connected component. The average width and height may be the mean (less preferred), median, or mode (the value that occur the most often; more preferred here) of the width and height. For example, the mode of the width or height may be obtained by constructing a histogram of the width or height distribution and finding the major peak of the distribution. When a document contains a reasonable amount of text, the average of the width and height of the connected components typically give the average width and height of the text characters.

Then, a number of judgment steps are applied to each connected component to determine whether it is a text component or a graphic component. For each connected component (step S23), it is first determined whether its size is too large (step S24). The threshold for this size determination may be a predetermined multiple (e.g., 5 times) of the average width or height calculated in step S22. If the width or height of the connected component is larger than the predetermined threshold ("Yes" in step S24), the connected component is deemed a graphic component and removed (step S27). Otherwise ("No" in step S24), it is determined whether the connected component is aligned with its neighbors (step S25). The alignment may be defined using the top, bottom, right, and/or left edges of the bounding boxes of the connected components. For example, the letters "a" and "c" will be aligned at both the top and the bottom; the letters "a" and "b" will be aligned only at the bottom; and the letters "a" and "g" will be aligned only at both the top; etc. A predetermined tolerance value (e.g., a few pixels) may be used to determine whether connected components are aligned with each other. Also, a predetermined threshold number of aligned neighbors may be used to determine whether the connected component is aligned with a sufficient number of its neighbors.

If the connected component is aligned with its neighbors ("Yes" in step S25), no further processing is applied (i.e. the connected component is kept in the document image), and the process proceeds to the next connected component (step S23). Otherwise ("No" in step S25), it is further determined whether the connected component has substantially the same size (both width and height) as a sufficient number of other connected components in the document (step S26). A predetermined tolerance (e.g. a few pixels) may be used to determine whether two connected components have substantially the same size. Also, a predetermined threshold number of other connected components having similar sizes may be used in step S26.

If the connected component has a similar size as a sufficient number of other connected components ("Yes" in step S26), no further processing is applied (i.e. the connected component is kept in the document image), and the process proceeds to the next connected component (step S23). Otherwise, the connected component is deemed a graphic component and removed (step S27).

After all connected components in the input document image have been processed ("No" in step S23), the result is an intermediate document image having the graphic components removed.

During the process of graphics removal, some text characters or part of text characters may become removed as well because they do not satisfy the alignment property or size property in the heuristic analyses. A main reason that some whole text characters get removed is because the checking conditions (e.g. steps S25, S26) are set very strict in order to ensure removal of graphics components. Also, dots in the letter "i" or "j", or dash ("-") in text lines may become removed because they do not align well with neighbors. Further, image quality can cause removal of text characters; for example, if a character is missing a bottom portion or top portion, alignment with its neighbors will be affected, and as a result the character may be removed.

However, because text components in a document tend to stay close to each other, this property can be utilized to recover removed text. Because of the high confidence level that all connected components that remain in the intermediate document image after the graphics removal process S2 is text, a search in the input binary document can be done in a predefined area immediately around each connected component of the intermediate image. If any image components (whole or part of connected components) are found in the search areas, these image components are considered text characters or parts of text characters and recovered. This search process is performed iteratively, using both existing and recovered text components to construct the search areas, until no additional image component is found in a search. This process can be referred to as text recovery. The result is that any connected component that is at least partially located within the predefined neighboring area around any of the text components, either text components in the intermediate document image or recovered text components, will be recovered.

Figure 3:
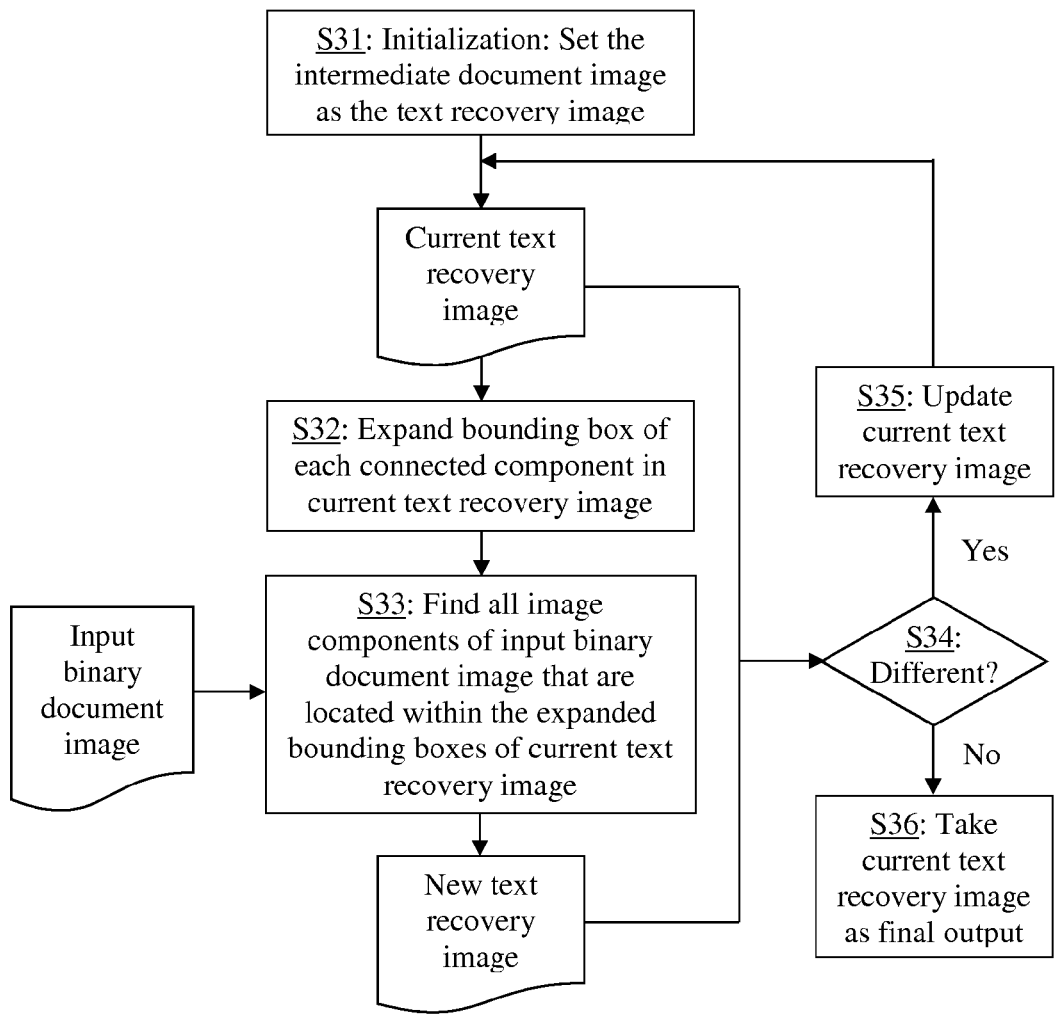

FIG. 3 schematically illustrates one implementation of the text recovery method. In step S31 (initialization), the intermediate document image (i.e. as the output of the graphics removal process) is set as the current text recovery image. Then, for each connected component of the current text recovery image, its bounding box is expanded in all four directions—left, right, up and down (step S32). The amount of expansion should be set so as to find lost text characters that are adjacent existing text characters, but not to pull in graphic components. In one implementation, the bounding box is expanded by one time the width of the bounding box in the left and right directions, and half the height of the bounding box at the top and bottom.

Then, a new text recovery image is generated which contains all image components of the input binary document image that are located within the areas defined by all of the expanded bounding boxes (step S33). This may be realized by appropriate logic operators. For example, if the document images are defined such that the text or graphic pixels have pixel value of 1 and background pixels have pixel value of 0, then step S33 can be implemented by setting all pixels within the expanded bounding boxes in the current text recovery image to 1 (and 0 elsewhere), and applying an AND operator to the modified current text recovery image and the input document image to generate the new text recovery image. If the document images are defined such that the text or graphic pixels have pixel value of 0 and background pixels have pixel value of 1, then step S33 can be implemented by setting all pixels within the expanded bounding boxes in the current text recovery image to 0 (and 1 elsewhere), and applying an OR operator to the modified current text recovery image and the input document image to generate the new text recovery image.

The new text recovery image is compared to the current text recovery image to determine whether they are different (step S34). This process (step S32, S33 and S34) is equivalent to searching the original binary document image in the neighborhood around each connected component of the current text recovery image to see if there are any image components in the original binary document image that are not in the current text recovery image.

If the new text recovery image and the current text recovery image are different ("Yes" in step S34), it means that the searching process found some text components or parts thereof. In such a case, the new text recovery image is set as the current text recovery image (step S35) and steps S32, S33 and S34 are repeated. Note that because each round of search is done only within the expanded bounding box, often only a part of a lost character is recovered in a round of search; since this part of the lost character becomes a part of the new text recovery image, its bounding box will be expanded when conducting the next round of search. As a result, the entire lost character may be recovered.

In an alternative implementation (not shown in FIG. 3), when the new text recovery image and the current text recovery image are different ("Yes" in step S34), an addition step is performed: for each newly recovered image component, the entire connected component to which the image component belongs are obtained and added to the new text recovery image. This may reduce the number of iterations of steps S32 and S33 required to recover all text components.

In step S34, if the new text recovery image is the same as the current text recovery image ("No" in step S34), the text recovery process stops, and the current (or the new) text recovery image is the final output (the output document image in FIG. 1).

The above described text recovery method can effectively and correctly recover text even in short lines. A purpose of the text recovery step is to recover the lost text without recovering graphic components. It is assumed here that in the input document image, graphics are separated from text by sufficiently large distances, e.g., larger than one times the average text character size. Using the iterative search method, so long as the search areas for each search are sufficiently small so as to not extend into graphics regions, graphic components will not be erroneously recovered. Random noise, such as small isolated black dots, that are located close to other text may be recovered as a part of text, but the adverse impact of such random noise is insignificant, particular if de-noising has been applied to the input document image (step S1). Also, it is noted that underlines that are located close to text characters will likely be recovered; thus, this graphics removal method is likely not effective in removing text underlines.

As mentioned earlier, other text properties and heuristic rules may be used in the graphic removal stage (step S2), or other graphic removal method may be used in lieu of the heuristic analyses method. However, all of graphics removal process tend to have the same problem, which is that, if the various criteria are not strict enough, significant graphic components may remain; but if the criteria are set too strict, some text will be removed during the process. Choosing the right criteria is not an easy task, in particular when document layout structure and quality change. Text recovery described herein can effectively solve this problem. It allows the various removal criteria to be set relatively strict in order to ensure removal of graphic components; removed text can be recovered in the text recovery stage as long as sufficient amount to text is preserved during the removal stage.

Figure 4:
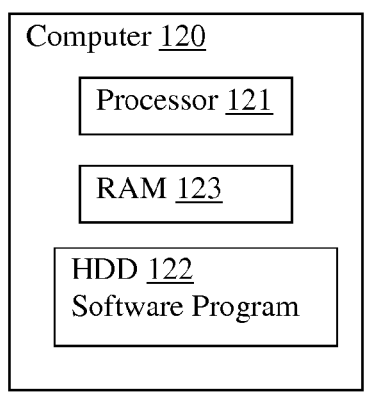
FIG. 4 schematically illustrates a data processing apparatus in which embodiments of the present invention may be implemented.

The graphic removal process described here can be implemented in a data processing system such as a computer 120 as shown in FIG. 4. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

In one aspect, the invention is a method carried out by a data processing system. In another aspect, the invention is computer program product embodied in computer usable

What is claimed is:

1. A method for removing graphics components in an input binary document image, comprising:
   (a) determining whether each connected component in the input binary document image is a text component or a graphic component, and removing all connected components that are determined to be graphic components to generate an intermediate document image, the intermediate document image containing a plurality of connected components that are determined to be text components;
   (b) recovering at least some connected components of the input binary document image that have been removed in step (a) as recovered text components, wherein the recovering step recovers any connected component that is at least partially located within a pre-defined neighboring area around either a text component in the intermediate document image or another recovered text component, including:
      (b1) setting the intermediate document image as a current text recovery image;
      (b2) for each connected component of the current text recovery image, defining an expanded bounding box around the connected component by expanding a bounding box of the connected component in one or more directions by predefined amounts;
      (b3) searching the input binary document image in the expanded bounding boxes of all connected component of the current text recovery image to find any new image components located within the expanded bounding boxes that are not present in the current text recovery image;
      (b4) updating the current text recovery image to include any new image components found in step (b3); and
      (b5) repeating steps (b2) to (b4) until no new image components are found within the expanded bounding boxes in step (b3),
      wherein the new image components found in all iterations of step (b3) collectively form the recovered text components; and
   (c) generating an output document image which contains only the connected components that are determined to be text components in step (a) and the connected components recovered in step (b).

2. The method of claim 1, wherein in step (b2), the bounding box of the connected component is expanded in the left and right directions by one time of a width of the bounding box, and expanded in the up and down directions by a half of a height of the bounding box.

3. The method of claim 2, wherein step (a) includes applying heuristic text analyses based on geometric properties of each connected component and relationships of each connected component relative to neighboring connected components to determine whether each connected component is a text component or a graphic component.

4. The method of claim 2, wherein step (a) comprises:
   finding all connected components in the input binary document image;
   calculating an average width and an average height of all the connected components;
   for each connected component in the input binary document image:
   (a1) determining the connected component to be a graphic component if its width or height is larger than the respective average width or height by predetermined amounts;
   (a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;
   (a3) if the connected component is not determined to be a text component in step (a2), determining the connected component to be a text component if it has substantially the same size as at least a second predefined number of other connected components of the input binary document image; and
   (a4) if the connected component is not determined to be a text component in step (s3), determining the connected component to be a graphic component.

5. The method of claim 4, wherein the average width and an average height are modes of width and height of all the connected components, and wherein in step (a1), the predetermined amounts are predetermined multiples of the average width and height.

6. The method of claim 1, wherein step (a) includes applying heuristic text analyses based on geometric properties of each connected component and relationships of each connected component relative to neighboring connected components to determine whether each connected component is a text component or a graphic component.

7. The method of claim 1, wherein step (a) comprises:
   finding all connected components in the input binary document image;
   calculating an average width and an average height of all the connected components;
   for each connected component in the input binary document image:
   (a1) determining the connected component to be a graphic component if its width or height is larger than the respective average width or height by predetermined amounts;
   (a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;
   (a3) if the connected component is not determined to be a text component in step (a2), determining the connected component to be a text component if it has substantially the same size as at least a second predefined number of other connected components of the input binary document image; and
   (a4) if the connected component is not determined to be a text component in step (s3), determining the connected component to be a graphic component.

8. The method of claim 7, wherein the average width and an average height are modes of width and height of all the connected components, and wherein in step (a1), the predetermined amounts are predetermined multiples of the average width and height.

9. A method for removing graphics components in an input binary document image, comprising:
(a) determining whether each connected component in the input binary document image is a text component or a graphic component, and removing all connected components that are determined to be graphic components to generate an intermediate document image, the intermediate document image containing a plurality of connected components that are determined to be text components, including:
finding all connected components in the input binary document image;
calculating an average width and an average height of all the connected components;
for each connected component in the input binary document image:
(a1) determining the connected component to be a graphic component if its width or height is larger than the respective average width or height by predetermined amounts;
(a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;
(a3) if the connected component is not determined to be a text component in step (a2), determining the connected component to be a text component if it has substantially the same size as at least a second predefined number of other connected components of the input binary document image; and
(a4) if the connected component is not determined to be a text component in step (s3), determining the connected component to be a graphic component;
(b) recovering at least some connected components of the input binary document image that have been removed in step (a) as recovered text components, wherein the recovering step recovers any connected component that is at least partially located within a pre-defined neighboring area around either a text component in the intermediate document image or another recovered text component; and
(c) generating an output document image which contains only the connected components that are determined to be text components in step (a) and the connected components recovered in step (b).

10. The method of claim 9, wherein the average width and an average height are modes of width and height of all the connected components, and wherein in step (a1), the predetermined amounts are predetermined multiples of the average width and height.

11. A computer program product comprising a computer usable non-transitory medium having a computer readable program code embedded therein for controlling a data processing apparatus, the computer readable program code configured to cause the data processing apparatus to execute a process for removing graphics components in an input binary document image, the process comprising:
(a) determining whether each connected component in the input binary document image is a text component or a graphic component, and removing all connected components that are determined to be graphic components to generate an intermediate document image, the intermediate document image containing a plurality of connected components that are determined to be text components;
(b) recovering at least some connected components of the input binary document image that have been removed in step (a) as recovered text components, wherein the recovering step recovers any connected component that is at least partially located within a pre-defined neighboring area around either a text component in the intermediate document image or another recovered text component, including:
(b1) setting the intermediate document image as a current text recovery image;
(b2) for each connected component of the current text recovery image, defining an expanded bounding box around the connected component by expanding a bounding box of the connected component in one or more directions by predefined amounts;
(b3) searching the input binary document image in the expanded bounding boxes of all connected component of the current text recovery image to find any new image components located within the expanded bounding boxes that are not present in the current text recovery image;
(b4) updating the current text recovery image to include any new image components found in step (b3); and
(b5) repeating steps (b2) to (b4) until no new image components are found within the expanded bounding boxes in step (b3),
wherein the new image components found in all iterations of step (b3) collectively form the recovered text components; and
(c) generating an output document image which contains only the connected components that are determined to be text components in step (a) and the connected components recovered in step (b).

12. The computer program product of claim 11, wherein in step (b2), the bounding box of the connected component is expanded in the left and right directions by one time of a width of the bounding box, and expanded in the up and down directions by a half of a height of the bounding box.

13. The computer program product of claim 12, wherein step (a) includes applying heuristic text analyses based on geometric properties of each connected component and relationships of each connected component relative to neighboring connected components to determine whether each connected component is a text component or a graphic component.

14. The computer program product of claim 12, wherein step (a) comprises:
finding all connected components in the input binary document image;
calculating an average width and an average height of all the connected components;
for each connected component in the input binary document image:
(a1) determining the connected component to be a graphic component if its width or height is larger than the respective average width or height by predetermined amounts;
(a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;

(a3) if the connected component is not determined to be a text component in step (a2), determining the connected component to be a text component if it has substantially the same size as at least a second predefined number of other connected components of the input binary document image; and (a4) if the connected component is not determined to be a text component in step (s3), determining the connected component to be a graphic component.

15. The computer program product of claim 14, wherein the average width and an average height are modes of width and height of all the connected components, and wherein in step (a1), the predetermined amounts are predetermined multiples of the average width and height.

16. The computer program product of claim 11, wherein step (a) includes applying heuristic text analyses based on geometric properties of each connected component and relationships of each connected component relative to neighboring connected components to determine whether each connected component is a text component or a graphic component.

17. The computer program product of claim 11, wherein step (a) comprises:

finding all connected components in the input binary document image;

calculating an average width and an average height of all the connected components;

for each connected component in the input binary document image:

(a1) determining the connected component to be a graphic component if its width or height is larger than the respective average width or height by predetermined amounts;

(a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;

(a3) if the connected component is not determined to be a text component in step (a2), determining the connected component to be a text component if it has substantially the same size as at least a second predefined number of other connected components of the input binary document image; and (a4) if the connected component is not determined to be a text component in step (s3), determining the connected component to be a graphic component.

18. The computer program product of claim 17, wherein the average width and an average height are modes of width and height of all the connected components, and wherein in step (a1), the predetermined amounts are predetermined multiples of the average width and height.

19. A computer program product comprising a computer usable non-transitory medium having a computer readable program code embedded therein for controlling a data processing apparatus, the computer readable program code configured to cause the data processing apparatus to execute a process for removing graphics components in an input binary document image, the process comprising:

(a) determining whether each connected component in the input binary document image is a text component or a graphic component, and removing all connected components that are determined to be graphic components to generate an intermediate document image, the intermediate document image containing a plurality of connected components that are determined to be text components, including:

finding all connected components in the input binary document image;

calculating an average width and an average height of all the connected components;

for each connected component in the input binary document image:

(a1) determining the connected component to be a graphic component if its width or height is larger than the respective average width or height by predetermined amounts;

(a2) if the connected component is not determined to be a graphic component in step (a1), determining the connected component to be a text component if it is aligned at its top, bottom, left or right edge with respective top, bottom, left or right edges of at least a first predefined number of other connected components of the input binary document image;

(a3) if the connected component is not determined to be a text component in step (a2), determining the connected component to be a text component if it has substantially the same size as at least a second predefined number of other connected components of the input binary document image; and (a4) if the connected component is not determined to be a text component in step (s3), determining the connected component to be a graphic component:

(b) recovering at least some connected components of the input binary document image that have been removed in step (a) as recovered text components, wherein the recovering step recovers any connected component that is at least partially located within a pre-defined neighboring area around either a text component in the intermediate document image or another recovered text component; and (c) generating an output document image which contains only the connected components that are determined to be text components in step (a) and the connected components recovered in step (b).

20. The computer program product of claim 19, wherein the average width and an average height are modes of width and height of all the connected components, and wherein in step (a1), the predetermined amounts are predetermined multiples of the average width and height.

* * * * *